3,116,333
METHOD OF PREPARING ACETALDEHYDE FROM ACETYLENE

Ronald W. Chapman, Whittier, and Roger M. Dille, La Habra, Calif., assignors to Texaco Inc., New York, N.Y., a corporation of Delaware
No Drawing. Filed Dec. 4, 1959, Ser. No. 857,246
4 Claims. (Cl. 260—605)

This invention relates to the hydration of acetylenic compounds to form carbonyl compounds. More particularly, it is concerned with the catalytic hydration of acetylene to produce acetaldehyde employing a novel catalyst composition.

An object of this invention is to provide a novel catalyst for the hydration of acetylene to acetaldehyde. Another object is to provide a method utilizing the novel caalyst. Still another object is to provide a method which produces increased yields of acetaldehyde. Other objects will become apparent from tne accompanying discussion and disclosure.

A well known method for converting acetylene to acetaldehyde is to contact pure acetylene or an acetylene-containing gas with an aqueous catalytic solution at an elevated temperature. As the acetylene comes in contact with the aqueous catalytic solution, it is converted to acetaldehyde in the following manner:

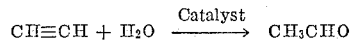

$$CH \equiv CH + H_2O \xrightarrow{Catalyst} CH_3CHO$$

Since the above hydration reaction is normally conducted at a temperature in excess of the boiling point of acetaldehyde (68° F.) the acetaldehyde product emerges from the liquid catalyst as a gas and is recovered by standard methods such as by fractional condensation or by absorption in an absorbent medium. In the latter recovery method the acetaldehyde is subsequently separated from the absorbent medium by fractional distillation.

In the past one of the catalytic solutions used for the conversion of acetylene to acetaldehyde comprises sulfuric acid, ferric sulfate, water and mercuric oxide. Another such solution comprises sulfuric acid, ferric sulfate, water and mercuric acetate. It is to be noted that the water ingredient in both solutions serves as a solvent medium for the other ingredients of the catalytic solution and can also serve as a reactant in the hydration of acetylene. Alternatively, the water reactant may be supplied by saturating the acetylene gas with water vapor prior to its introduction into the catalyst solution. This saturation is normally accomplished by bubbling acetylene gas through water maintained at an elevated temperature, e.g. 150–200° F.

We have discovered that by including a small amount of acetic acid in the above-identified catalysts conversion of acetylene to acetaldehyde is increased from 50 to 100% and higher. More specifically, we have discovered a novel catalyst for the conversion of acetylene to acetaldehyde comprising sulfuric acid, ferric sulfate, acetic acid, water and a member selected from the group consisting of mercuric oxide and mercuric acetate. In addition, we have found that an acetic concentration of about 2 wt. percent in the novel catalyst produces optimum yields of acetaldehyde product. Higher and lower concentrations of acetic acid while providing increased yields of acetaldehyde do not produce yields of the same magnitude as the about 2 wt. percent acetic acid concentration.

The ingredient proportions of the novel catalyst are advantageously maintained between about 1 and 25 wt. percent sulfuric acid, 3 and 15 wt. percent ferric sulfate, 0.5 and 4 wt. percent acetic acid, 0.1 and 2 wt. percent mercuric oxide or mercuric acetate, with the remainder of the catalyst being composed of water.

The catalyst of our invention can be readily prepared by incorporating sulfuric acid, ferric sulfate, acetic acid and mercuric oxide or mercuric acetate in water, preferably with stirring. As to the particular order of ingredient addition, it is desirable to incorporate the mercuric oxide or mercuric acetate in a sulfuric acid-water solution of about 25 wt. percent acid concentration before adding the remainder of the catalytic ingredients thereto. This particular order of combining ingredients reduces the tendency of compounds of mercury to precipitate from the catalytic solution. The novel catalyst is desirably prepared at temperatures ranging from 80–200° F. in order to promote the rapid solution of the solid ingredients. However, the catalyst can also be readily formed at room temperature and lower.

In addition to the unexpected feature of acetic acid increasing yields 50–100% and more, another unexpected feature of our invention is that if the mercuric oxide or mercuric acetate component of the novel catalyst composition is replaced by mercuric sulfate, a well-known ingredient in acetylene to acetaldehyde conversion catalysts, the addition of acetic acid has little or no effect in promoting higher yields. It therefore appears that there is a selective synergistic-like interaction between the acetic acid on the one hand and the ingredient combination of sulfuric acid, ferric sulfate, water and mercuric oxide or mercuric acetate on the other.

In the method of the invention acetylene or an acetylene-containing gas (between about 1–100 wt. percent $C_2H_2$) is contacted with the liquid catalyst at a temperature of at least about 100° F., preferably between 170 and 200° F. Reaction temperatures of above 212° F. may also be employed. If the hydration reaction is conducted at a temperature above about 212° F., superatmospheric pressure, e.g. 1–100 p.s.i.g., is desirably impressed upon the reaction system to prevent excessive vaporization of the water component. In the preferred procedure, acetylene-containing gas saturated with water vapor is introduced into the bottom section of the reaction apparatus holding the liquid catalyst solution and bubbled therethrough. At the reaction temperature the acetaldehyde product exists from the catalytic solution as a gas and may be recovered by any of the standard means such as fractionally condensing said product from the exit gases. Another means of recovery is bubbling the exit gases into water maintained at a temperature and pressure favoring the liquid state of acetaldehyde, e.g. at 50° F. and 1 atm. pressure. The water under such conditions selectively absorbs the acetaldehyde from the exit product gas. The acetaldehyde is subsequently released from its water solution by fractional distillation.

One of the most suitable sources of acetylene for our process is a gaseous mixture known in the art as "synthesis gas." Synthesis gas is produced by reacting a hydrocarbon, e.g. natural gas, with oxygen or an oxygen-containing gas, e.g. air, at a temperature from about 2500–3500° F. and a pressure of from 0–100 p.s.i.g. for a reaction time of .001–1 second. The gaseous product, known as synthesis gas, is desirably rapidly cooled to a temperature below 800° F., i.e. quenched, to minimize further decomposition. Quenching can be accomplished by passing the gas product through water. Synthesis gas is composed mainly of hydrogen, carbon monoxide and acetylene. Nitrogen is also a major component if air is used as one of the initial reactants. The acetylene content in the synthesis gas is normally between 0.5 and 10 wt. percent, more likely between 1 and 5%. One of the advantages of utilizing synthesis gas in our novel process from a commercial point of view is that the carbon monoxide and hydrogen ingredients therein are unaffected by our process and pass out from the catalytic hydrator in the exit gases. The carbon monoxide and hydrogen, readily separable from the acetaldehyde product, can be used in subsequent processes such as the Fischer Tropsch process.

The following example and table further illustrate our invention:

EXAMPLE I

The procedure below was employed for all experimental runs reported in subsequent Table 1.

A gaseous mixture consisting of 98 wt. percent nitrogen and 2 wt. percent acetylene was saturated with water vapor by bubbling the mixture through water maintained in a glass washing bottle located in a water bath of 180° F. The gaseous mixture was then withdrawn from the top of the washing bottle and bubbled at a rate of 0.5 cu. ft./hr. into the bottom section of a vertically positioned glass hydration tube of 1¼ x 26 inch dimensions filled with 4 x 4 mm. glass Raschig rings and 300 cc. of catalytic solution. The hydration tube was maintained in a water bath of 180° F. and the catalytic solution in the hydrator was held at a constant level by placing or removing the previously described washing bottle from the 180° F. water bath. The exit gases containing the acetaldehyde product were withdrawn from the top of the hydrator and analyzed. The foregoing procedure was conducted for approximately a four hour period. During the reaction period the acetylene content of the feed and product gases was measured by gas chromatograph on a continuous basis. The acetaldehyde content in the product gas was periodically measured in a mass spectrometer.

It is to be noted that the above procedure was modified in respect to run 3 and run 4 described in subsequent Table 1. The modification consisted of passing the catalytic solution through the glass tube hydrator in countercurrent flow to the acetylene gas reactant at a rate of 66 cc./minute. The countercurrent flow of catalyst was accomplished by introducing the catalyst into the top section of the hydrator, withdrawing the catalyst from the bottom section thereof and recycling the withdrawn catalyst to said top section.

The catalyst compositions tested are as follows:

| Catalyst Designation | Ingredient | Wt. percent |
|---|---|---|
| A*, A₂* | $H_2SO_4$ | 25.0 |
| | $Fe_2(SO_4)_3$ | 14.3 |
| | $CH_3COOH$ | 2.0 |
| | $HgO$ | 1.0 |
| | $H_2O$ | 57.7 |
| A₁* | $H_2SO_4$ | 25.0 |
| | $Fe_2(SO_4)_3$ | 14.3 |
| | $CH_3COOH$ | 4.0 |
| | $HgO$ | 1.0 |
| | $H_2O$ | 55.7 |
| A₃ | $H_2SO_4$ | 25.0 |
| | $Fe_2(SO_4)_3$ | 14.3 |
| | $HgO$ | 1.0 |
| | $H_2O$ | 59.7 |
| B,* B₁* | $H_2SO_4$ | 25.0 |
| | $Fe_2(SO_4)_3$ | 14.3 |
| | $CH_3COOH$ | 2.0 |
| | $HgO$ | 0.2 |
| | $H_2O$ | 58.5 |
| B₂ | $H_2SO_4$ | 25.0 |
| | $Fe_2(SO_4)_3$ | 14.3 |
| | $HgO$ | 0.2 |
| | $H_2O$ | 60.5 |
| C* | $H_2SO_4$ | 25.0 |
| | $Fe_2(SO_4)_3$ | 14.3 |
| | $CH_3COOH$ | 2.0 |
| | $(CH_3COO)_2Hg$ | 0.2 |
| | $H_2O$ | 58.5 |
| C₁ | $H_2SO_4$ | 25.0 |
| | $Fe_2(SO_4)_3$ | 14.3 |
| | $(CH_3COO)_2Hg$ | 0.2 |
| | $H_2O$ | 60.5 |
| D | $H_2SO_4$ | 25.0 |
| | $Fe_2(SO_4)_3$ | 14.3 |
| | $CH_3COOH$ | 2.0 |
| | $HgSO_4$ | 0.2 |
| | $H_2O$ | 58.5 |
| D₁ | $H_2SO_4$ | 25.0 |
| | $Fe_2(SO_4)_3$ | 14.3 |
| | $HgSO_4$ | 0.2 |
| | $H_2O$ | 60.5 |

*These catalysts are representatives of the novel catalyst of the invention.

In the following table, the average percent conversion of acetylene to acetaldehyde utilizing the above catalysts is reported:

Table 1

| Run No. | Catalyst | Percent Acetic Acid in Catalyst | Percent Conversion |
|---|---|---|---|
| 1 | A* | 2 | 88 |
| 2 | A₁* | 4 | 86 |
| 3 | A₂* | 2 | 72 |
| 4 | A₃ | 0 | 33 |
| 5 | B* | 2 | 60 |
| 6 | B₁* | 2 | 62 |
| 7 | B₂ | 0 | 30 |
| 8 | C* | 2 | 59 |
| 9 | C₁ | 0 | 35 |
| 10 | D | 2 | 47 |
| 11 | D₁ | 0 | 45 |

*These catalysts are representatives of the novel catalyst of the invention.

As can be seen from the above, the inclusion of acetic acid in the catalytic composition of sulfuric acid, ferric sulfate, water and mercuric oxide or mercuric acetate increases the acetaldehyde yield from about 70 to about 100%. In distinction, the addition of acetic acid to the well-known catalytic composition of sulfuric acide, ferric sulfate, mercuric sulfate and water as represented in runs 10 and 11 produced less than a 5% increase in acetylene conversion. Table 1 also shows acetic acid concentrations of about 2% in the novel catalyst solutions produces optimum yields of acetaldehyde.

All percentages hereinbefore and hereinafter described are based on weight unless otherwise stated.

Obviously, many modifications and variations of the invention as hereinbefore set forth may be made without departing from the spirit and scope thereof and therefore onl such limitations should be imposed as are indicated in the appended claims.

We claim:

1. A method for the preparation of acetaldehyde comprising passing acetylene gas saturated with water vapor through a liquid catalyst solution maintained at a temperature of at least about 100° F. under a pressure of less than 100 p.s.i.g., and recovering said acetaldehyde, said solution consisting essentially of between about 1 and 25 wt. percent sulfuric acid, between about 3 and 15 wt. percent ferric sulfate, between about 0.5 and 4 wt. percent acetic acid and between about 0.1 and 2 wt. percent of a member selected from the group consisting of mercuric oxide and mercuric acetate, the remainder of said solution being composed of water.

2. A method in accordance with claim 1 wherein said solution comprises 25 wt. percent sulfuric acid, 14.3 wt. percent ferric sulfate, 2 wt. percent acetic acid, 1 wt. percent mercuric oxide and 57.7 wt. percent water.

3. A method in accordance with claim 1 wherein said solution comprises 25 wt. percent sulfuric acid, 14.3 wt. percent ferric sulfate, 2 wt. percent acetic acid, 0.2 wt. percent mercuric oxide and 58.5 wt. percent water.

4. A method in accordance with claim 1 wherein said solution comprises 25 wt. percent sulfuric acid, 14.3 wt. percent ferric sulfate, 2 wt. percent acetic acid, 0.2 wt. percent mercuric acetate and 58.5 wt. percent water.

References Cited in the file of this patent

UNITED STATES PATENTS

| 2,153,985 | Lieseberg et al. | Apr. 11, 1939 |
| 2,254,212 | Dinwiddie | Sept. 2, 1941 |
| 2,303,279 | Isham | Nov. 24, 1942 |
| 2,815,332 | Grosser | Dec. 3, 1957 |
| 2,842,504 | Jones | July 8, 1958 |

FOREIGN PATENTS

| 5,132 | Great Britain | Apr. 3, 1915 |

OTHER REFERENCES

Remy: Treatise on Inorganic Chemistry, vol. II (1956), page 284.